United States Patent [19]

Sugio et al.

[11] Patent Number: 4,489,186
[45] Date of Patent: Dec. 18, 1984

[54] POLYPHENYLENE ETHER RESIN COMPOSITION

[75] Inventors: Akitoshi Sugio, Ohmiya; Masanobu Masu, Toyonaka; Masao Okabe, Abiko; Eiji Ukita, Tokyo, all of Japan

[73] Assignee: Mitsubishi Gas Chemical Company, Inc., Tokyo, Japan

[21] Appl. No.: 511,087

[22] Filed: Jul. 5, 1983

[30] Foreign Application Priority Data

Jul. 5, 1982 [JP] Japan .................. 57-116417

[51] Int. Cl.³ .................. C08K 5/20; C08K 5/52
[52] U.S. Cl. .................. 524/151; 524/153; 524/217; 524/220; 524/226
[58] Field of Search ........... 524/151, 153, 220, 224, 524/226, 217

[56] References Cited

U.S. PATENT DOCUMENTS

| | | | |
|---|---|---|---|
| 3,462,517 | 8/1969 | Hansen et al. | 524/226 |
| 3,529,982 | 9/1970 | Luethi et al. | 524/224 |
| 3,639,334 | 1/1972 | Holoch | 524/151 |
| 3,808,273 | 4/1974 | Burdet et al. | 524/225 |
| 3,816,562 | 6/1974 | Holoch et al. | 524/223 |
| 3,933,737 | 1/1976 | Glander et al. | 524/226 |

Primary Examiner—V. P. Hoke
Attorney, Agent, or Firm—Wenderoth, Lind & Ponack

[57] ABSTRACT

A polyphenylene ether resin composition comprising
(1) a polyphenylene ether resin,
(2) an oxanilide represented by the following formula

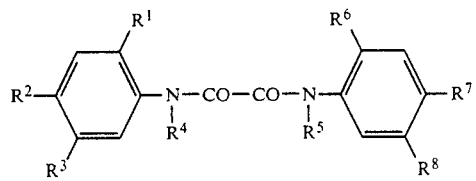

wherein $R^1$ and $R^6$ are identical or different and each represents a hydrogen atom, an alkyl group having 1 to 8 carbon atoms, or an alkoxy group having 1 to 15 carbon atoms, $R^2$ and $R^7$ are identical or different and each represents a hydrogen atom, an alkyl group having 1 to 8 carbon atoms, or an alkoxy group having 1 to 10 carbon atoms, $R^3$ and $R^8$ are identical or different and each represents a hydrogen atom or an alkyl group having 1 to 8 carbon atoms, and $R^4$ and $R^5$ are identical or different and each represents a hydrogen atom, an alkyl group having 1 to 6 carbon atoms, or a dialkylaminoalkyl group with the alkyl moiety having 1 to 6 carbon atoms,
(3) an organic phosphite, and
(4) a hindered phenolic antioxidant.

4 Claims, No Drawings

POLYPHENYLENE ETHER RESIN COMPOSITION

This invention relates to a polyphenylene ether resin composition. More specifically, it relates to a polyphenylene ether resin composition comprising a polyphenylene ether resin, an oxanilide (an oxalic acid dianilide) and an organic phosphite and optionally a sterically hindered phenol.

Polyphenylene ether is a known resin disclosed in various known publications, for example U.S. Pat. Nos. 3,306,874, 3,306,785, 3,257,357, 3,257,358 and 4,011,200, and Japanese Laid-Open Patent Publication No. 126800/1975. Since polyphenylene ether generally has a high softening point, it possesses useful properties as a material used in fields which require heat resistance. Because of its high softening point, the polyphenylene ether requires higher temperatures than general-purpose resins during kneading and extrusion for production of resin compositions containing the polyphenylene ether resin. Molding and processing of such polyphenylene ether resin compositions require high temperatures. Frequently, unlike general-purpose resins, molded articles of the polyphenylene ether resin compositions are used for a long period of time at relatively high temperatures. As is well known, the polyphenylene ether is susceptible to oxidation at high temperatures and therefore to degradation during extrusion and molding at high temperatures. Such oxidation and degradation may cause deterioration in the properties of resin compositions containing the polyphenylene ether and/or may cause their coloration. Such degradation and/or coloration will limit wide application of resin compositions containing the polyphenylene ether.

When resin compositions containing the polyphenylene ether are used outdoors, their properties are markedly degraded with the lapse of time. To improve the weatherability of the polyphenylene ether is also important to the use of the polyphenylene ether resin composition in a wide range of fields.

Methods have already been proposed to stabilize resin compositions containing the polyphenylene ether. These methods can roughly be divided into two groups. One group is directed to the capping of the hydroxyl groups present at the terminals of the molecules of the polyphenylene ether by acylation, etc., and the other group, to the addition of stabilizers.

Stabilizers for the polyphenylene ether which have heretofore been known include benzoates (see U.S. Pat. No. 3,379,875); hexaalkylphosphoric triamides either alone or with other compounds (see U.S. Pat. Nos. 3,414,536, 3,420,792, 3,429,850, 3,465,062, 3,472,814, 3,483,271, 3,792,121 and 3,816,562); octaalkylpyrophosophoramides either alone or with other compounds (see U.S. Pat. No. 3,450,670); amines (see U.S. Pat. Nos. 3,563,934 and 3,956,423); phosphites and hydrazines (see U.S. Pat. No. 3,639,334); alkanolamines (see U.S. Pat. No. 3,761,541); arylphosphonic diamides (see U.S. Pat. No. 3,792,120); sterically hindered phenols containing a triazine or isocyanuric ring (see U.S. Pat. No. 4,154,719); substituted dicarboxylic acid dihydrazides (see U.S. Pat. No. 3,954,904); high-molecular-weight phosphites either alone or with other compounds (see U.S. Pat. No. 3,952,072); amides (see Japanese Patent Publication No. 29,748/1969); metal salts of dithiocarbamic acid (see Japanese Patent Publications Nos. 19,395/1970 and 8,352/1970); carboxylic acid anhydrides (see Japanese Patent Publication No. 29,750/1969); phosphites (see Japanese Laid-Open Patent Publication No. 29,751/1969); sterically hindered phenols either alone or with other compounds (see Japaneese Patent Publications Nos. 43,473/1971, 42,029/1971, 42,030/1971, 42,031/1971, 42,032/1971 and 43,033/1971); sterically hindered phenols having one amide linkage in the molecules (see Japanese Patent Publication No. 24,782/1971); sterically hindered phenols containing one ester linkage in the molecules (see Japanese Patent Publication No. 38,623/1973); high-molecular-weight phosphites (see Japanese Laid-Open Patent Publications Nos. 23,846/1974, 31,755/1974 and 40,476/1975); combinations of phosphorous acid amides with boron compounds (see Japanese Laid-Open Patent Publication No. 129,750/1974); diphosphonites having a specified structure either alone or with sterically hindered phenols (see Japanese Laid-Open Patent Publication No. 125,448/1981); sterically hindered phenols having a specified structure (see Japanese Laid-Open Patent Publication No. 129,249/1981); phosphonic acid or its esters, or combinations of these with sterically hindered phenols (see Japanese Laid-Open Patent Publication No. 145,945/1981); monophosphonous acid and its esters, or combinations of these with sterically hindered phenols (see Japanese Laid-Open Patent Publication No. 3,852/1982); amine derivatives having a specified structure (see Japanese Laid-Open Patent Publication No. 21,455/1982); and metal salts of phosphonic acid either alone or with sterically hindered phenols (see Japanese Laid-Open Patent Publication No. 70,156/1982).

Numerous stabilizers for polyphenylene ether resins and polyphenylene ether resin compositions comprising such stabilizers have been known. It is still desired however to develop a polyphenylene ether resin composition which can find practical application in a wide range of fields by utilizing the high softening point of polyphenylene ether.

It is an object of this invention therefore to provide a polyphenylene ether resin composition of high grade which can find practical applications in a wide range of fields by utilizing the high softening point of polyphenylene ether.

Another object of this invention is to provide a novel polyphenylene ether resin composition having various properties, particularly excellent heat stability which makes the composition withstand use for a long period of time at high temperatures and excellent weatherability which makes it withstand outdoor use for a long period of time.

Other objects and advantages of this invention will become apparent from the following description.

According to this invention, these objects can be achieved by a polyphenylene ether resin composition comprising (1) a polyphenylene ether resin,
(2) an oxanilide represented by the following formula

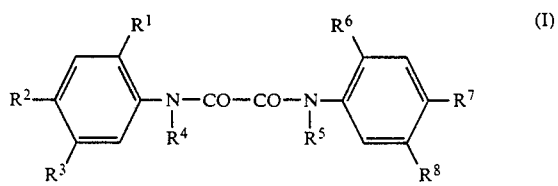

wherein $R^1$ and $R^6$ are identical or different and each represents a hydrogen atom, an alkyl group having 1 to 8 carbon atoms or an alkoxy group having 1 to 15 carbon atoms, $R^2$ and $R^7$ are identical or different and each represents a hydrogen atom, an alkyl group having 1 to 8 carbon atoms or an alkoxy group having 1 to 10 carbon atoms, $R^3$ and $R^8$ are identical or different and each represents a hydrogen atom or an alkyl group having 1 to 8 carbon atoms, and $R^4$ and $R^5$ are identical or different and each represents a hydrogen atom, an alkyl group having 1 to 6 carbon atoms, or a dialkylaminoalkyl group with the alkyl moiety having 1 to 6 carbon atoms, and (3) an organic phosphite.

The polyphenylene ether resin constituting the resin composition of this invention denotes a polyphenylene ether polymer and a blend of a polyphenylene ether polymer with another resin and/or an elastomer. The polyphenylene ether polymer herein means a homo- or copolymer of polyphenylene ether, and a graft polymer obtained by grafting an aromatic vinyl compound to such a homo- or copolymer.

Preferably, the homopolymer or copolymer of polyphenylene ether is obtained by polycondensing a monocyclic phenol represented by the following formula

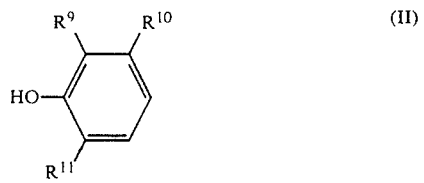

wherein $R^9$ represents a lower alkyl group having 1 to 3 carbon atoms, and $R^{10}$ and $R^{11}$, independently from each other, represent a hydrogen atom or an alkyl group having 1 to 3 carbon atoms.

The homopolymer can be obtained from a single monocyclic phenol, and the copolymer, from two or more monocyclic phenols.

The alkyl group having 1 to 3 carbon atoms in general formula (II) denotes methyl, ethyl, n-propyl and iso-propyl groups.

Examples of the monocyclic phenol of general formula (II) include 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol. Thus, examples of polyphenylene ether resins obtained by polycondensing these monocyclic phenols include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)-ether, poly(2-methyl-6-propyl-1,4-phenylene)ether and poly(2-ethyl-6-propyl-1,4-phenylene)ether, and copolymers such as 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer and 2,6-dipropylphenol/2,3,6-trimethylphenol copolymer.

Of these, poly(2,6-dimethyl-1,4-phenylene)ether and 2,6-dimethylphenol/2,3,6-trimethylphenol copolymer are preferred.

As the aforesaid graft polymer, preferred is a graft polymer obtained by grafting an aromatic vinyl compound represented by the following formula (III)

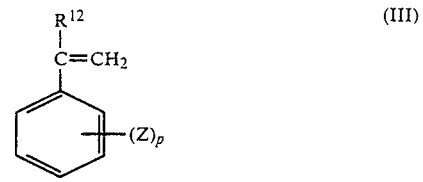

wherein $R^{12}$ represents a hydrogen atom or a lower alkyl group, Z represents a halogen atom or a lower alkyl group, and p is 0 or an integer of 1 to 3, to the homo- or co-polymer of polyphenylene ether. The graft polymer can be produced, for example, by the method described in Japanese Laid-Open Patent Publication No. 126,800/1975. Examples of the aromatic vinyl compound are styrene, alpha-methylstyrene, vinyltoluene, vinylxylene, ethylstyrene, n-propylstyrene, iso-propylstyrene, chlorostyrene and bromostyrene.

Polystyrene-type resins are preferred as the other resin to be blended with the phenylene ether polymer. For example, those which contain at least 25% by weight of structural units of the following formula (IV)

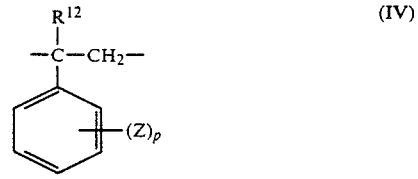

wherein $R^{12}$, Z and P are as defined with regard to formula (III), are preferred.

The lower alkyl group in general formula (IV) is preferably an alkyl group having 1 to 3 carbon atoms, such as methyl, ethyl, n-propyl and isopropyl.

The halogen atom in general formula (IV) is preferably chlorine or bromine.

The structural units of formula (IV) are derived from a styrene monomer of the above formula (III).

Examples of preferred polystyrene-type resins are polystyrene, high-impact polystyrene (rubber-modified polystyrene), styrene/butadiene copolymer, styrene/butadiene/acrylonitrile copolymer, styrene/alpha-methylstyrene copolymer, styrene/acrylic rubber/acrylonitrile copolymer, styrene/alpha-methylstyrene copolymer and styrene/butadiene resinous block copolymer. They may be used either singly or in combination.

Polymers having a Young's modulus at room temperature of $10^5$ to $10^9$ dynes/cm$^2$ (0.1 to 1020 kg/cm$^2$) in accordance with the definition given in A. V. Tobolsky, "Properties and Structures of Polymers" (John Wiley & Sons, Inc., 1960), pages 71 to 78 may be used as the elastomer to be blended with the polyphenylene ether polymer.

Examples of such elastomers include A—B—A' type elastomeric block copolymers (wherein A and A' are blocks resulting from polymerization of an aromatic vinyl compound, and B is a block resulting from polymerization of a conjugated diene), A—B'—A' type elastomeric block copolymers (wherein A and A' are the same as above, and B' is a block resulting from hydrogenation of the block B above), polybutadiene, an elastomeric copolymer of a diene compound and an aromatic vinyl compound, nitrile rubber, ethylene/propylene copolymer, ethylene/propylene/diene copolymer (EPDM), thiokol rubbers, polysulfide rubbers, acrylic rubbers, a grafted product of butyl rubber and polyethylene, polyurethan rubbers, and polyester elastomers. Of these, the A—B—A' type and A—B'—A' elastomeric block copolymers are preferred, and those in which the molecular weight of the block B or B' is higher than the total sum of the molecular weight of the block A and the molecular weight of the block A' are especially preferred. The block A or A' is, for example, a homo-block or co-block resulting from the polymerization of a monocyclic aromatic vinyl compound such as styrene, alpha-methylstyrene, vinyltoluene, vinylxylene or ethylvinylxylene, or a polycyclic aromatic vinyl compound such as vinylnaphthalene, and preferably has a molecular weight of about 2,000 to about 100,000. The block B is, for example, an elastomeric block resulting from the polymerization of a conjugated diene compound such as 1,3-butadiene, 2,3-dimethylbutadiene, isoprene and 1,3-pentadiene. The block B' results from the hydrogenation of the block B. The block B or B' preferably has a molecular weight of about 25,000 to about 1,000,000.

The other resin such as the polystyrene-type resin can be blended in an amount of 5 to 95 parts by weight, preferably 15 to 85 parts by weight, per 100 parts by weight of the polyphenylene ether polymer and the other resin combined. The elastomer can be incorporated in an amount of 5 to 98 parts by weight, preferably 15 to 95 parts by weight, per 100 parts by weight of the polyphenylene ether polymer and the elastomer combined.

The oxanilide included in the resin composition of this invention is represented by the following formula (I).

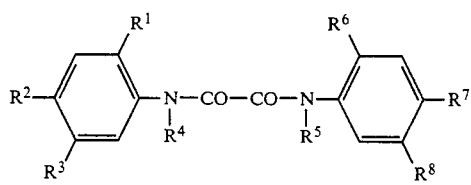

wherein $R^1$ and $R^6$ are identical or different and each represents a hydrogen atom, an alkyl group having 1 to 8 carbon atoms or an alkoxy group having 1 to 15 carbon atoms, $R^2$ and $R^7$ are identical or different and each represents a hydrogen atom, an alkyl group having 1 to 8 carbon atoms, or an alkoxy group having 1 to 10 carbon atoms, $R^3$ and $R^8$ are identical or different and each represents a hydroged atom or an alkyl group having 1 to 8 carbon atoms, and $R^4$ and $R^5$ are identical or different and each represents a hydrogen atom, an alkyl group having 1 to 6 carbon atoms or a dialkylaminoalkyl group with the alkyl moiety having 1 to 6 carbon atoms.

The alkyl group having 1 to 8 carbon atoms for $R^1$ and $R^6$ may be linear of branched, and includes, for example, methyl, ethyl, n-propyl, iso-propyl, n-butyl, sec-butyl, tert-butyl, n-pentyl, n-hexyl, and n-octyl. The alkoxy group having 1 to 15 carbon atoms for $R^1$ and $R^6$ may be linear or branched, and includes for example, methoxy, ethoxy, n-propoxy, iso-propoxy, n-butoxy, sec-butoxy, tert-butoxy, n-pentoxy, n-hexoxy, n-octoxy, n-nonanoxy, n-decanoxy, n-undecanoxy, n-dodecanoxy, n-tridecanoxy, n-tetradecanoxy, and n-pentadecanoxy.

A hydrogen atom, alkyl groups having 1 to 5 carbon atoms and alkoxy groups having 1 to 15 carbon atoms are preferred as $R^1$ and $R^6$.

The same species as exemplified above can be cited as the alkyl group having 1 to 8 carbon atoms for $R^2$ and $R^7$, and examples of the alkoxy group having 1 to 10 carbon atoms for these symbols will be apparent from the above exemplification.

A hydrogen atom, alkyl groups having 1 to 5 carbon atoms and alkoxy groups having 1 to 15 carbon atoms are preferred as $R^2$ and $R^7$.

The alkyl group having 1 to 8 carbon atoms for $R^3$ and $R^8$ is the same as exemplified hereinabove. A hydrogen atom and alkyl groups having 1 to 5 carbon atoms are preferred as $R^3$ and $R^8$.

Examples of the alkyl group having 1 to 6 carbon atoms for $R^4$ and $R^5$ will be apparent from the groups exemplified for $R^1$ and $R^6$. The dialkylaminoalkyl group is one in which each alkyl group has 1 to 6 carbon atoms. Specific examples include dimethylaminoethyl, dimethylaminopropyl, diethylaminoethyl, diethylaminopropyl, dipropylaminomethyl and dipropylaminoethyl.

Preferred as $R^4$ and $R^5$ are a hydrogen atom, alkyl groups having 1 to 6 carbon atoms, and those dialkylaminoalkyl groups in which each alkyl group in the dialkyl moiety has 1 to 3 carbon atoms and the alkyl moiety substituted by the dialkylamino group has 1 to 5 carbon atoms.

Examples of the oxanilide of formula (I) are given below.

2-Ethoxy-5-tert-butyl-2'-ethyloxanilide of the formula:

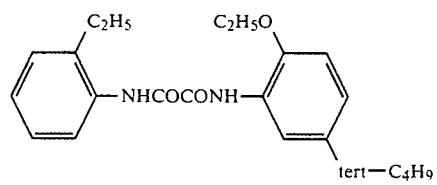

2-Ethoxy-2'-ethyloxanilide of the formula

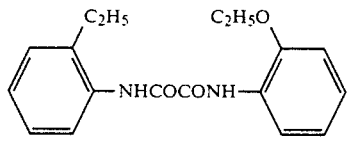

4,4'-Dioctyloxyoxanilide of the formula:

2,2'-Dioxtyloxy-5,5'-di-tert-butyloxanilide of the formula:

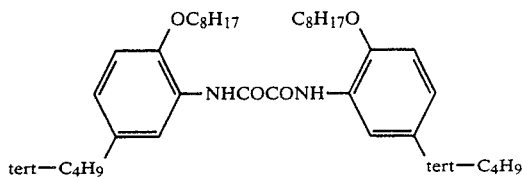

2,2'-Didodecyloxy-5,5'-di-tert-butyloxanilide of the formula:

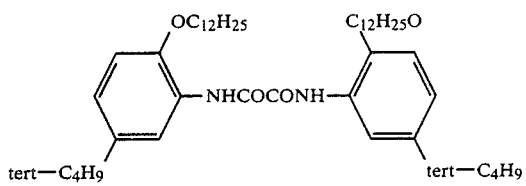

N,N'-bis(3-dimethylaminopropyl)oxanilide of the formula:

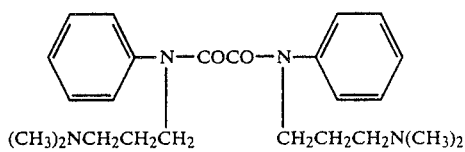

2-Ethoxy-2'-ethyl-5,4'-di-tert-butyloxanilide of the formula:

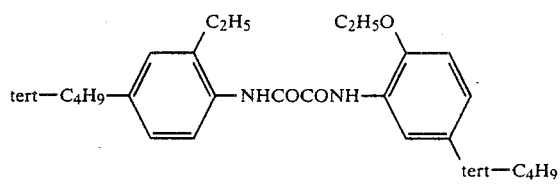

These oxanilides may be used singly or in combination with each other.

The organic phosphite contained in the resin composition of this invention includes organic phosphites and organic thiophosphites.

These organic phosphites are represented, for example, by the following formula (V)

$$(R-X)_3P \qquad (V)$$

wherein the R groups are identical or different and each represents an alkyl group, preferably an alkyl group having 2 to 18 carbon atoms, an aryl group, preferably a phenyl group, or a phenyl group substituted by an alkyl group having 1 to 10 carbon atoms and X represents an oxygen or sulfur atom.

Specific examples of the organic phosphites include triphenyl phosphite, tricresyl phosphite, triisooctyl phosphite, tridecyl phosphite, tri-2-ethylhexyl phosphite, trioctadecyl phosphite, tri(octylphenyl)phosphite, tri(nonylphenyl)phosphite, tridodecyl thiophosphite, phenyldiethyl phosphite, phenyl-di(2-ethylhexyl)phosphite, isooctyldiphenyl phosphite, diisooctylmonophenyl phosphite, and di(2-ethylhexyl)mono(isooctylphenyl)phosphite. Distearylpentaerythritol diphosphite, and hydrogenated bisphenol A phosphite resin can also be preferably used as the organic phosphites.

The resin composition of this invention comprises a polyphenylene ether resin, and amounts effective for imparting heat stability and/or weatherability of the oxanilide of formula (I) and the organic phosphite.

The amount of the oxanilide used is usually 0.01 to 5 parts by weight, preferably 0.05 to 3 parts by weight, more preferably 0.1 to 2 parts by weight, per 100 parts by weight of the polyphenylene ether resin.

The amount of the organic phosphite is usually 0.01 to 5 parts by weight, preferably 0.05 to 3 parts by weight, more preferably 0.1 to 2 parts by weight, per 100 parts by weight of the polyphenylene ether resin.

Even when the oxanilide and the organic phosphite are used in amounts exceeding the above-specified upper limits, no further appreciable improvement in the heat stability and weatherability of the resin composition can be obtained, and rather the increased amounts may adversely affect the properties of the resin composition, such as a decrease in its heat distortion temperature. On the other hand, when these additives are used in amounts below the specified lower limits, the effects of these additives are not as great as expected.

According to this invention, the resin composition preferably contains a sterically hindered phenol. The sterically hindered phenol acts synergistically with the oxanilide and the organic phosphite, and imparts higher heat stability and weatherability to the resin composition of this invention. Examples of the sterically hindered phenol which can be used in this invention include monohydric phenol such as 2,6-di-tert-butyl-p-cresol, 2-tert-butyl-4-methoxyphenol, 2,4-dinonylphenol, octadecyl-3-(3,5-di-tert-butyl-4-hydroxyphenyl)propionate, diethyl 3,5-di-tert-butyl-4-hydroxybenzylphosphonate, or 2-(3',5'-di-tert-butyl-4'-hydroxyanilino)-4,6-dioctylthio-1,3,5-triazine; dihydric phenols such as 2,2'-methylenebis(4-methyl-6-tert-butylphenol), 2,2'-methylenebis(4-ethyl-6-tert-butylphenol), butylidenebis(methyl-butylphenol), 4,4'-thiobis(6-tert-butyl-3-methylphenol), 1,1-bis(4-hydroxyphenyl)cyclohexane, 1,6-hexanediol-bis3-(3,5-di-tert-butyl-4-hydroxyphenyl)propionate, 2,2'-thiodiethyl-bis[3-(3,5-di-tert-butyl-4-hydroxyphenyl)propionate] or N,N'-hexamethylenebis(3,5-di-tert-butyl-4-hydroxyhydrocinnamide); trihydric phenols such as 1,3,5-tris(4-tert-butyl-3-hydroxy-2,6-dimethylbenzyl)-isocyanuric acid, 2,4,6-tris(3',5'-di-tert-butyl-4'-hydroxybenzyl)-1,3,5-triazine, an ester of 3,5-di-tert-butyl-4-hydroxyhydrocinnamic acid with 1,3,5-tris(2-hydroxyethyl-S-triazine-2,4,6(1H,3H,5H)-trione), or 1,1,3-tris(2'-methyl-4'-hydroxy-5'-tert-butylphenyl)butane; and tetrahydric phenols such as pentaerythrityltetrakis[3-(3,5-di-tert-butyl-4-hydroxyphenyl)propionate]. These hindered phenols may be used singly or in combination with each other.

The amount of the sterically hindered phenol is usually 0.5 to 5 parts by weight, preferably 0.1 to 3 parts by weight, more preferably 0.5 to 2 parts by weight, per 100 parts by weight of the polyphenylene ether resin.

As required, the resin composition of this invention may further contain various additives, fillers, etc.

Examples of such additives include lubricants such as polyolefin waxes (e.g., polyethylene wax or polypropylene wax); organic phosphate-type fire-retarding plasticizers such as triphenyl phosphate, tricresyl phosphate or a phosphate obtained from a mixture of isopropylphenol and phenol; bromine-type fire retardants such as decarbromobiphenyl, pentabromotoluene and decabromobiphenyl ether; and pigments such as titanium dioxide, zinc sulfide or zinc oxide.

Examples of the fillers are inorganic fillers typified by glass fibers, asbestos, and flakes of wollastonite, mica, talc, copper, aluminum or nickel; and organic fillers typified by carbon fibers.

These fillers and additives may be used in amounts which do not reduce the heat resistance of the resin composition.

The following examples illustrate the resin composition of this invention more specifically. Unless otherwise specified, all parts and percentages in these examples are by weight.

EXAMPLE 1 AND COMPARATIVE EXAMPLES 1 AND 2

Sixty parts of a 2,6-dimethylphenol (95 mole%)/2,3,6-trimethylphenol (5 mole%) copolymer having an intrinsic viscosity, determined at 25° C. in chloroform, of 0.52 dl/g, 37 parts of high-impact polystyrene (the intrinsic viscosity of the polystyrene matrix measured at 25° C in chloroform, 0.90 dl/g; the gel content analyzed by using methyl ethyl ketone as a solvent, 12.9%), 2 parts of a polystyrene-polybutadiene-polystyrene block copolymer (the weight ratio of the polystyrene blocks to the polybutadiene block, 30:70; the viscosity measured at 25° C. for its 20% toluene solution by means of a Blookfield Model RVT viscometer, 1500 cps), 1 part of an ethylene/propylene copolymer (reduced viscosity measured at 135° C. using decalin as a solvent in a concentration of 0.1 g/100 ml, 2.0; the glass transition point, −49° C.), 6 parts of triphenyl phosphate, 2 parts of titanium dioxide, 0.4 part of hydrogenated bisphenol A phosphite resin, 0.6 part of 2,2'-methylene-bis(4-methyl-6-tert-butylphenol) and 0.1 part of 2-ethoxy-5-tert-butyl-2'-ethyloxanilide were thoroughly mixed by using a Henschel mixer. The resulting mixture was pelletized by extruding through a twin-screw extruder (a trade name, AS-30, manufactured by Nakatani Machinery Co., Ltd.) in which the maximum temperature of the cylinder was set at 290° C. The pellets were molded under an injection pressure of 1,050 kg/cm² by an injection molding machine (a trade name SJ-35, manufactured by Meiki Co., Ltd.) in which the maximum temperature of the cylinder was set at 280° C. to prepare test specimens for measurement of tensile impact strength. The test specimens obtained were heat-aged by maintaining them in a hot air circulating oven kept at 115° C. for 10 days. Separately, the test specimens were subjected to an exposure test for 100 hours using a Sunshine Weather-O-Meter.

The above procedure was repeated except that the hydrogenated bisphenol A phosphite resin, 2,2'-methylenebis(4-methyl-6-tert-butylphenol) and 2-ethoxy-5-tert-butyl-2'-ethyloxanilide were not used (Comparative Example 1).

The above procedure was repeated except that 0.44 part of the hydrogenated bisphenol A phosphite resin and 0.66 part of 2,2'-methylenebis(4-methyl-6-tert-butylphenol) were used, and 2-ethoxy-5-tert-butyl-2'-ethyloxanilide was not used (Comparative Example 2).

The tensile impact strength values of the test specimens before and after the tests are summarized in Table 1.

TABLE 1

| | Tensile impact strength (kg · cm/cm²) | | |
|---|---|---|---|
| | Before testing | After heat aging | After exposure |
| Example 1 | 149 | 110 (74%) | 72 (48%) |
| Comp. Ex. 1 | 160 | 60 (38%) | 66 (41%) |
| Comp. Ex. 2 | 145 | 94 (65%) | 61 (42%) |

(Note): The parenthesized figures in % are percent retentions calculated in accordance with the following equation.

$$\text{Retention (\%)} = \frac{\text{Value after testing}}{\text{Value before testing}} \times 100$$

It is seen from the results given in Table 1 that the resin composition of this invention has very much increased heat resistance and weatherability.

EXAMPLE 2

Example 1 was repeated except that 2-ethoxy-2'-ethyloxanilide was used instead of 2-ethoxy-5-tert-butyl-2'-ethyloxanilide. The results are shown in Table 2.

TABLE 2

| | Tensile impact strength (kg · cm/cm²) | | |
|---|---|---|---|
| | Before testing | After heat aging | After exposure |
| Example 2 | 158 | 129 (82%) | 71 (45%) |

EXAMPLE 3 AND COMPARATIVE EXAMPLES 1 AND 3

Example 1 was repeated except that 0.4 part of tris(nonylphenyl)phosphite was used instead of 0.4 part of the hydrogenated bisphenol A phosphite resin, and 0.6 part of 2,6-di-tert-butyl-p-cresol was used instead of 0.6 part of 2,2'-methylenebis(4-methyl-6-tert-butylphenol).

The above procedure was repeated except that tris(nonylphenyl)phosphite, 2,6-di-tert-butyl-p-cresol and 2-ethoxy-5-tert-butyl-2'-ethyloxanilide were not used (Comparative Example 1).

The above procedure was repeated except that 0.44 part of tris(nonylphenyl)phosphite and 0.66 part of 2,6-di-tert-butyl-p-cresol were used, and 2-ethoxy-5-tert-butyl-2'-ethyloxanilide was not used (Comparative Example 3).

The tensile impact strengths of the test specimens before and after the tests are shown in Table 3.

TABLE 3

| | Tensile impact strength (kg · cm/cm²) | | |
|---|---|---|---|
| | Before testing | After heat aging | After exposure |
| Example 3 | 151 | 109 (72%) | 73 (48%) |
| Comp. Ex. 1 | 160 | 60 (38%) | 66 (41%) |
| Comp. Ex. 3 | 155 | 104 (67%) | 62 (40%) |

EXAMPLE 4

Example 1 was repeated except that 1 part of 2-ethoxy-2'-ethyloxanilide was used instead of 0.1 part of 2-ethoxy-5-tert-butyl-2'-ethyloxanilide. The results are shown in Table 4.

TABLE 4

| | Tensile impact strength (kg · cm/cm²) | | |
|---|---|---|---|
| | Before testing | After heat aging | After exposure |
| Example 4 | 145 | 123 (85%) | 90 (62%) |

EXAMPLE 5 AND COMPARATIVE EXAMPLE 4

Example 1 was repeated except that 2,2'-methylenebis(4-methyl-6-tert-butylphenol) was not used, and 1 part of the hydrogenated bisphenol A phosphite resin and 0.1 part of 2-ethoxy-5-tert-butyl-2'-ethyloxanilide were used.

Separately, Example 1 was repeated except that 2,2'-methylenebis(4-methyl-6-tert-butylphenol) and 2-ethoxy-5-tert-butyl-2'-ethyloxanilide were not used, and 1.1 parts of hydrogenated bisphenol A phosphite was used (Comparative Example 4).

The results are shown in Table 5.

TABLE 5

| | Tensile impact strength (kg · cm/cm²) | | |
|---|---|---|---|
| | Before testing | After heat aging | After exposure |
| Example 5 | 158 | 100 (63%) | 73 (46%) |
| Comp. Ex. 4 | 148 | 86 (58%) | 60 (41%) |

What is claimed is:

1. A polyphenylene ether resin composition comprising (1) a polyphenylene ether resin, (2) 0.01 to 5 parts per 100 parts by weight of the polyphenylene ether resin of an oxanilide represented by the following formula

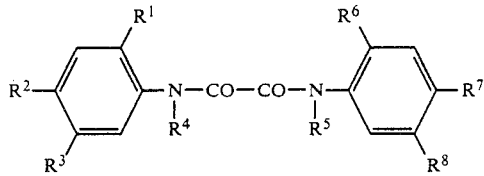

wherein $R^1$ and $R^6$ are identical or different and each represents a hydrogen atom, an alkyl group having 1 to 8 carbon atoms, or an alkoxy group having 1 to 15 carbon atoms, $R^2$ and $R^7$ are identical or different and each represents a hydrogen atom, an alkyl group having 1 to 8 carbon atoms, or an alkoxy group having 1 to 10 carbon atoms, $R^3$ and $R^8$ are identical or different and each represents a hydrogen atom or an alkyl group having 1 to 8 carbon atoms, and $R^4$ and $R^5$ are identical or different and each represents a hydrogen atom, an alkyl group having 1 to 6 carbon atoms, or a dialkylaminoalkyl group with the alkyl moiety having 1 to 6 carbon atoms (3) 0.01 to 5 parts per 100 parts by weight of the polyphenylene ether resin of an organic phosphite, and (4) 0.5 to 5 parts per 100 parts by weight of the polyphenylene ether resin of a sterically hindered phenol.

2. The resin composition of claim 1 wherein the polyphenylene ether resin is a phenylene ether homopolymer, a phenylene ether copolymer, a grafted polyphenylene ether polymer, or a mixture of any of these polymers with another resin or an elastomer.

3. The resin composition of claim 2 wherein the other resin is a polystyrene-type resin.

4. The resin composition of claim 2 wherein the elastomer has a Young's modulus at room temperature of from $10^5$ to $10^9$ dynes/cm².

* * * * *